July 18, 1967 T. M. ONESON 3,331,305
DUCT ATTACHMENT FOR ATTACHING AN AIR DIFFUSER TO AN AIR DUCT
Filed June 29, 1966
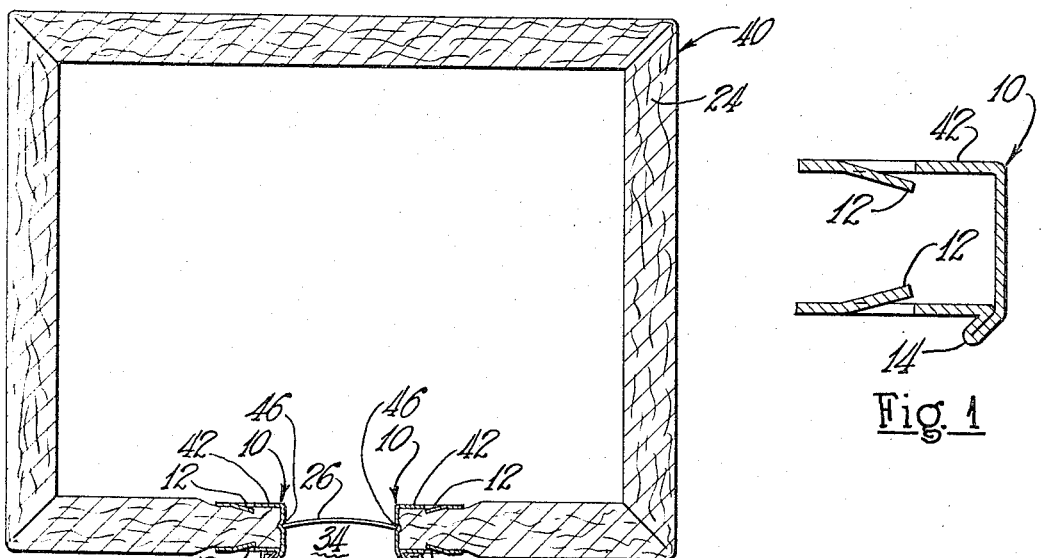
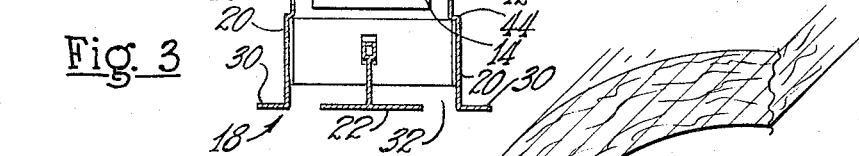
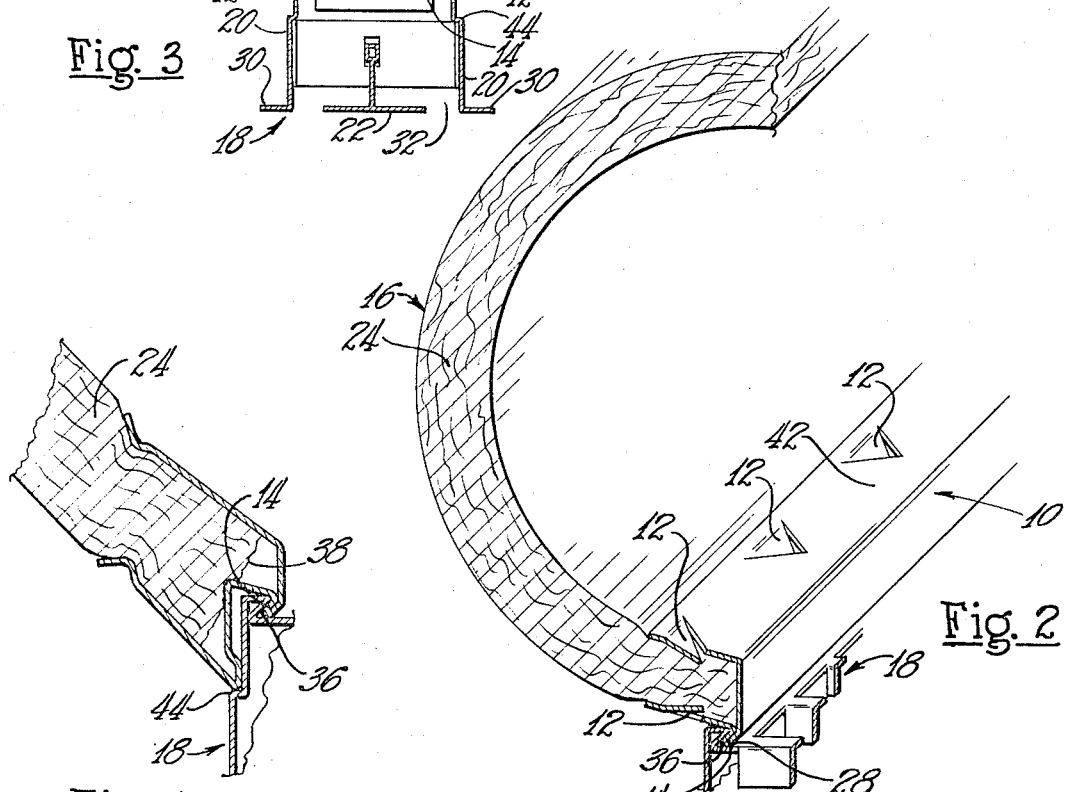
INVENTOR.
THOMAS M. ONESON
BY Staelin & Overman
ATTORNEYS United States Patent Office 3,331,305
Patented July 18, 1967

3,331,305
DUCT ATTACHMENT FOR ATTACHING AN AIR DIFFUSER TO AN AIR DUCT
Thomas M. Oneson, Newark, Ohio, assignor to Owens-Corning Fiberglas Corporation, a corporation of Delaware
Filed June 29, 1966, Ser. No. 561,573
5 Claims. (Cl. 98—40)

Specifically, this invention pertains to a clip or clamping device which when placed over the edge of a resilient tube or duct will affix itself thereto, so that a portion of the clamp or device may be operably engaged with an air channel or diffuser.

In the past it has been customary to install linear air diffusers within an air distribution system so that the air diffuser emanates from the duct or air tube, to facilitate the passage of air therefrom. To maintain the necessary connection for the passage of air from the duct or tube to the diffuser, it has often been necessary to use elaborate systems for sealing the joint between the two. These systems have employed tape, clips, splines and other cumbersome sealing devices. The methods of attachment have often included elaborate splicing devices made of expanded metal and other fixtures to bring the contact between the duct and the air diffuser or channel into a tight fitting relationship. The manpower expended installing these units in operable relationship to each other has often been excessive and has amounted to nothing more than patchwork when the job was finished. It can be appreciated that a taped fitting would only be as good as the adhesive on the tape and the strength of the tape for maintaining the joint created thereby. Furthermore the tape would not provide a splice which would be subject to a very strong bending moment at the point of splice. The duct or air tube, with the foregoing method of attachment, tends to fall over and does not remain in vertical alignment with the diffuser; thus the strain on the tape is further aggravated causing undue ruptures in the joint. A rupture in the splice between the air duct and the diffuser is intolerable if the rupture is unduly multiplied. The foregoing creates an insufficient supply of air to the diffuser, and an undesirable perturbation of the flow of air in the duct.

The installation of air conditioning and ventilating systems in the field, has often led to excessive labor costs and increased the overall cost of the systems installed. This has usually been the result of the many splices and custom installation requirements. The field installation equipment has furthermore not been of the most advantageous type to allow a facile installation of the duct with the diffusers attached thereto.

This invention has eliminated the necessity for elaborate tools, splines, clips, splices and techniques which have not proved reliable. Thus, the inventor, by means of this invention has enabled the air conditioning industry to install an air distribution system with lower labor costs, and a surety that the reliability of the splice will be maintained during the life of the installation.

It is therefore an object of this invention to provide a strong and reliable splice between an air tube or duct and an air diffuser or channel.

A further object of this invention is to provide an inexpensive means for joining a duct or air tube to an air diffuser.

Another object of this invention is to provide an easily installed splicing device between a duct and a diffuser.

A further object of this invention is to provide a device which will affix a diffuser to a duct with a simple two step operation.

This invention can be more readily understood by referring to the accompanying drawings in which FIGURE 1 shows a specific embodiment of the cross section of the clip disclosed herein.

FIGURE 2 shows a perspective cross sectional view of the device when it is used for splicing the opening of a diffuser to a round duct.

FIGURE 3 is a vertical cross section showing a square duct with the invention holding the duct to the diffuser.

FIGURE 4 is a modification of the invention disclosed herein showing a clamping frictional engagement of the duct.

Referring to the drawings, it can be seen that a duct 16 or 40 is affixed by the invention 10 to the diffuser 18 thereunder. The line of joinder 28 was previously sealed with a piece of tape, or a complicated insert or spline. Although the diffuser 18 is of a linear type, it must be understood that the diffuser 18 and the connecting clip 10 used therewith are only shown as specific embodiments, of the best mode contemplated for use of the invention. The connecting clip 10 may be used for any joint between a duct 16 or 40 and a diffuser 18.

The air diffuser 18 is of a linear type having ledges 30 which support ceiling boards thereon. The diffuser 18 may be used in any particular manner as long as the opening 32 therein passes air emanating from the throat 34. The diffuser 18 is usually installed with a diverting member 22, in order to spread the air emerging from the diffuser 18.

The diffuser 18 usually has sidewalls 20 which form the main structural components thereof. The sidewalls 20 are usually formed in such a manner as to permit connection thereof to a duct. The diffuser sidewalls 20 can be made from sheet metal, a metal or plastic extrusion or a combination thereof. The diffuser sidewalls 20 in this case are shown with inwardly sloping shoulders 36 forming part of the sidewalls 20. The sidewall shoulders 36 are only illustrative of the type of accommodating device which may be used with the clip 10 as disclosed herein.

It is well known in the art to use a duct 16 or 40 made of fibrous material 24 for the distribution of air. The duct 16 not only serves as an air passage but is also used to thermally insulate the air, thereby precluding losses from thermally insulate the air, thereby precluding losses from from sheet metal and then separately insulated with a fibrous wool bat or cover. It was found of late that ducts made from fibrous insulating material alone have provided the necessary structural rigidity and thermal insulation properties thereby being cheaper and easier to install than the combination ducts.

The duct 16 as shown herein has been made from a fibrous glass wool blanket formed into a tube. The tube has a certain degree of resilience. When a slot 34 is cut longitudinally out of the length thereof, the slot 34 will expand after being contracted and released by the resilience of the duct 16 pulling the walls of the slot apart. It is this expansive action which is used to facilitate the operativeness of the invention as disclosed herein. It should be appreciated that the clip 10 of this invention can be used in any location, where a moment of force either mechanically or gravitationally, is applied to the flanged surface 14 of the channeled member 10.

Although it is not necessary that a round duct 16 as shown be used, it is found that the expansive action of the round duct 16 works most propitiously with the invention as disclosed herein. Thus, for the best application of the invention as disclosed herein a round expanding duct should be used, but is not necessary. For example, if it is assumed that the square duct 40 does not have a significantly resilient expansive action in its structure, the most efficacious application of the invention, would be to supplement the resilience of the duct with a leaf spring 26 having the ends thereof implaced in detents 46 in that portion of the clip forming the sidewalls or throat 34 passing between the edge surfaces of the duct 38. Thus the foregoing embodiment would facilitate maintaining the flanges 14 in tight fitting engagement with the shoulders 36.

The best mode contemplated of the invention as shown in place comprises a channeled clip member 10 which is made of sheet metal. The lower corner is crimped to form a flange 14 along the longitudinal length thereof. The flange 14 can also be an arcuate extension of the corner so as to hook onto the surface of the shoulder 36. The diffuser 18 can also be made to accommodate a cooperating clip having a squeezing action on the fibrous duct with a ledge 44 along the sidewall 20 thereof as shown in FIGURE 4. However, the preferred clip 10 has barbs 12 expanded or punched through the channel walls 42. To provide greater gripping power between the duct and the channeled member the barbs 12 should be punched in both channel walls 42. The barbs 12 are punched so that they slant inwardly. When the duct is slid into the channeled members the barbs accommodate the fibrous duct and upon withdrawal transfix themselves into the fibrous content of the duct. The barbs may be lessened in number if the surface or covering material of the duct is composed of a substantially strong material. The loading is then imposed on a higher strength material and precludes the barbs 12 from tearing therefrom. This principle is particularly applicable where the duct has a tough skin or membrane thereover.

It can thus be seen that when a fibrous body composed of a resilient fibrous material is slid into the channeled member 10, the material will slide over the barbs 12 which form an obtuse angle away from the opening in the sidewalls 42 forming the channeled clip 10. Upon the fibrous body sliding over the barbs 12, they will then be enmeshed with the fibrous body and withstand any reverse movement of the body against the barbs 12 when the duct is slid back against the portion of the barbs 12 forming an acute angle with the channeled walls 42. The channeled walls 42 are usually sprung inwardly so that the fibrous member or duct 16 slid thereinto is squeezed by the channeled walls 42 thus forcing the barbs into intimate contact with the fibrous material.

As previously generally alluded to, the barbs 12 are punched and spaced along the channeled member 10 at different intervals depending upon the density of the duct 16 or the material on the surface thereof to be engaged. The barbs 12 can be punched any suitable size, as long as they engage a sufficient amount of fibrous material to the degree required for maintaining the duct within the channeled clip 10 under all outward tensile stresses imposed.

Although the foregoing specific embodiments have generally dealt with ducts which when expanded force the flange of the clip 14 against the shoulders of the diffuser 36, it must be appreciated that this invention may be used with ducts which are in compression. Thus a duct having sufficient compressive force can be used to support a diffuser or be tightly affixed thereto.

It is easily seen from the foregoing that the disclosure herein makes the installation of ducts a facile matter. All that is required is an insertion of the duct into the channeled member 10 by means of pressing the channeled clip member over the edges of the slot in the duct 16. Once the channeled member 10 is in place over the edges of the slot within the duct 16, all that remains to be done is a slight compression of the slot provided within the duct 16, and a placement of the crimped corners or flanges 14 within the channel created between the shoulders 36. A release of the compression exerted on the duct locks the duct to the diffuser shoulders 36 thus creating a joinder thereto. Installed in the foregoing manner the invention when tested was found extremely satisfactory and provided a closure having a minimum of air leakage.

The foregoing embodiments of the invention herein should be looked at in light of the fact that the heart of the invention relies upon a grasping of a resilient body by a member with an attendant biasing of the member against an air diffuser or channel for connection therewith.

Having thusly described my invention, I hereby claim:

1. In an air distributing system employing a peripherally resilient fibrous duct having an elongated slot therein with a diffuser cooperatively joined to the duct for the distribution of air to a space, the improvement which comprises:
   a clip, having spaced walls forming a channeled opening therebetween for insertion of the edge region of the duct slot;
   barbs sloping inwardly away from the opening of the channel and affixed to the channel wall for engagement of the duct;
   a connecting flange extending from the clip for engagement with an accommodating portion of the diffuser so that when the duct is engaged by the barbs in the opening the connecting flange will be biased against the accommodating portion of the diffuser thus forming a joinder between the duct and the diffuser.

2. In an air distributing system employing a peripherally resilient fibrous duct having an elongated slot therein with a diffuser cooperatively joined to the duct slot for the distribution of air to a space as described in claim 1 wherein:
   the walls of the channeled clip are made from a resilient material which will resiliently press said barbs against a portion of the duct.

3. In an air distributing system employing a peripherally resilient fibrous duct having an elongated slot therein with a diffuser cooperatively joined to the duct slot for the distribution of air to a space as described in claim 1 wherein:
   the flange is formed at an acute angle generated from the outer periphery of the duct and away from the edge regions of the duct slot whereby the biasing action of the duct maintains the flange the clip engaged with the accommodating surface of the diffuser.

4. An improved means for joining a fibrous duct having an elongated slit therein to an elongated walled air diffuser, said duct being characterized by an outwardly resilient nature comprising:
   an elongated pair of clips, each having elongated channel walls spaced for insertion of the edge regions of the duct slit;
   at least one protuberance extending inwardly from at least one wall of each of said clips so that upon insertion of the edge region of that portion of said duct adjoining the slit within said clips, said protuberance will frictionally engage said duct;
   flanges extending from said clips at an angle for locking engagement with the diffuser walls when the edge regions of said duct slit are expanded by means of the outwardly resilient nature of said duct so that the flanges will be biased against the diffuser walls to form a joinder to the diffuser for the conduction of air from said duct to the diffuser.

5. A system for joining a walled elongated air diffuser to an air duct with a slit therein comprising:
   a pair of elongated channel walled cilps with an opening between the channel walls for the receipt of the edge regions of the duct adjoining the slit;
   at least one protuberance extending inwardly from one of the channel walls of each clip;
   a flange extending from each of said clips for engagement with an accommodating portion extending from the walls of the air diffuser;
   spring means for biasing said flanges against the accommodating portions of the air diffuser walls so that when the flanges are so biased with the duct inserted in said clips, there will be a joinder for the passage of air from the duct to the diffuser.

(References on following page)

References Cited

UNITED STATES PATENTS

| | | | |
|---|---|---|---|
| 756,261 | 4/1904 | Miller | 138—158 |
| 2,160,009 | 5/1939 | Walker | 138—158 X |
| 3,088,392 | 5/1963 | Egan | 98—40 |
| 3,223,019 | 12/1965 | Schuh | 98—40 |
| 3,227,063 | 1/1966 | Lambert | 98—40 |

ROBERT A. O'LEARY, *Primary Examiner.*

W. E. WAYNER, *Assistant Examiner.*